United States Patent
Aziz et al.

(10) Patent No.: US 8,315,298 B2
(45) Date of Patent: *Nov. 20, 2012

(54) METHOD AND APPARATUS FOR RATE-DEPENDENT EQUALIZATION

(75) Inventors: Pervez M Aziz, Dallas, TX (US); Mohammad S Mobin, Orefield, PA (US); Gregory W Sheets, Breinigsville, PA (US); Lane A Smith, Easton, PA (US); Paul H. Tracy, Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 1133 days.

This patent is subject to a terminal disclaimer.

(21) Appl. No.: 11/930,780

(22) Filed: Oct. 31, 2007

(65) Prior Publication Data

US 2009/0110045 A1   Apr. 30, 2009

(51) Int. Cl.
   *H03H 7/30*   (2006.01)
(52) U.S. Cl. ........................................ 375/232
(58) Field of Classification Search ........... 375/229–232
   See application file for complete search history.

(56) References Cited

U.S. PATENT DOCUMENTS

| | | | | |
|---|---|---|---|---|
| 4,686,686 A | * | 8/1987 | Nakayama et al. | 375/229 |
| 4,759,035 A | * | 7/1988 | McGary et al. | 375/230 |
| 6,445,733 B1 | * | 9/2002 | Zuranski et al. | 375/231 |
| 6,597,733 B2 | * | 7/2003 | Pollmann et al. | 375/222 |
| 7,065,134 B2 | * | 6/2006 | Papanikolaou et al. | 375/229 |
| 7,693,088 B2 | * | 4/2010 | Daugherty et al. | 370/253 |
| 2006/0080586 A1 | * | 4/2006 | Starr | 714/746 |
| 2006/0093368 A1 | * | 5/2006 | Giaretta | 398/135 |
| 2007/0195874 A1 | * | 8/2007 | Aziz et al. | 375/233 |
| 2007/0201545 A1 | * | 8/2007 | Zamir et al. | 375/229 |

* cited by examiner

*Primary Examiner* — David B. Lugo

(74) *Attorney, Agent, or Firm* — Ryan, Mason & Lewis, LLP

(57) ABSTRACT

Methods and apparatus are provided for equalizing a received signal. A received signal is equalized by determining a data rate of the received signal; obtaining one or more equalization parameters associated with the determined data rate; and equalizing the received signal using the obtained one or more equalization parameters. The equalization parameters may comprise, for example, one or more of a gain parameter, zero control for a high pass filter and one or more threshold settings for one or more latches used during the equalizing step, such as data latches or transition latches (or both).

18 Claims, 7 Drawing Sheets

PER CHANNEL EQUALIZATION

PER CHANNEL INTELLIGENT EQUALIZATION PROCESS

STICKY STATUS

METHOD AND APPARATUS FOR RATE-DEPENDENT EQUALIZATION

CROSS-REFERENCE TO RELATED APPLICATIONS

The present application is related to U.S. patent application Ser. No. 11/540,946, filed Sep. 29, 2006, entitled "Method and Apparatus for Determining Latch Position for Decision-Feedback Equalization Using Single-Sided Eye," and U.S. patent application Ser. No. 11/686,148, filed Mar. 14, 2007, entitled "Method and Apparatus for Decision-Feedback Equalization Using Single-Sided Eye with Global Minimum Convergence," U.S. patent application Ser. No. 11/414,522, filed Apr. 28, 2006, entitled "Method and Apparatus for Determining a Position of a Latch Employed for Decision-feedback Equalization," U.S. patent application Ser. No. 11/541,379, filed Sep. 29, 2006, entitled "Method and Apparatus for Non-Linear Decision-Feedback Equalization in the Presence Of Asymmetric Channel," and U.S. patent application Ser. No. 11/864,110, filed Sep. 28, 2007, entitled "Methods and Apparatus for Positioning One or More DFE Transition Latches Based on Incoming Data Eye," each incorporated by reference herein.

FIELD OF THE INVENTION

The present invention relates generally to equalization techniques, and more particularly, to techniques for intelligent equalization.

BACKGROUND OF THE INVENTION

Communication networks increasingly carry information at various data rates. The selected data rate for a given communication can be pre-established between the transmitter and receiver, can be signaled, for example, using handshaking techniques, or can by dynamically determined by the receiver. Data rate detection techniques allow a receiver to determine the rate of incoming data, for example, by examining the received data. Such automatic data rate detection techniques allow a receiver to receive data from a variety of transmitting devices operating at different speeds without having to establish data rates in advance.

Signals arriving at a receiver are typically corrupted by intersymbol interference (ISI), crosstalk, echo, and other noise. In order to compensate for such channel distortions, communication receivers often employ well-known equalization techniques. For example, zero equalization or decision-feedback equalization (DFE) techniques (or both) are often employed. Such equalization techniques are widely-used for removing intersymbol interference and to improve the noise margin See, for example, R. Gitlin et al., Digital Communication Principles, (Plenum Press, 1992) and E. A. Lee and D. G. Messerschmitt, Digital Communications, (Kluwer Academic Press, 1988), each incorporated by reference herein Generally, zero equalization techniques equalize the pre-cursors of the channel impulse response and decision-feedback equalization equalizes the post cursors of the channel impulse response.

A communication channel typically exhibits a low pass effect on a transmitted signal. The various frequency components of a signal will thus encounter different attenuation at the output of the channel, with higher frequency components of a transmitted signal being impaired more than lower frequency components. Thus, the impairment of a channel is said to be rate-dependent. As a result, the equalization parameters optimized for one data rate will typically not be applicable fox another data rate.

In the absence of a received signal, the receiver lacks information (data transitions) and cannot sustain a frequency lock. If the equalizer is allowed to train when the signal has been lost, the equalizer will produce invalid updates. Likewise, there are a number of predefined patterns that are not sufficiently spectrally rich to provide valid equalization results. For example, many communications systems continuously send an idle pattern to keep the system alive, in a similar manner to a heart beat signal. The idle pattern, however, is not spectrally rich and is therefore not good for equalization.

A need therefore exists for rate-dependent methods and apparatus for equalizing a channel. A further need exists for equalization methods and apparatus that can detect the data rate, and perform equalization based on the detected data rate. Yet another need exists for equalization methods and apparatus that update the equalization parameters only if one or more predefined qualifier conditions, such as a loss of signal, are not present.

SUMMARY OF THE INVENTION

Generally, methods and apparatus are provided for equalizing a received signal According to one aspect of the invention, a received signal is equalized by determining a data rate of the received signal; obtaining one or more equalization parameters associated with the determined data late; and equalizing the received signal using the obtained one or more equalization parameters The equalization parameters may comprise, for example, one or more of a gain parameter, zero control for a high pass filter and one or more threshold settings for one or more latches used during the equalizing step, such as data latches or transition latches (or both).

The equalization can be an incremental steady state equalization if the equalization parameters have been previously determined for the determined data rate or a full equalization if valid equalization parameters are not available for the determined data rate. The rate can be determined, for example, by analyzing the received signal or obtaining a data rate established by a controller.

A more complete understanding of the present invention, as well as further features and advantages of the present invention, will be obtained by reference to the following detailed description and drawings.

DETAILED DESCRIPTION

The present invention provides intelligent methods and apparatus for equalizing a channel. According to one aspect of the invention, the data rate is detected and equalization is performed based on the detected data rate. A smart equalizer is disclosed that maintains equalization parameters for each supported rate. The disclosed smart equalizer automatically activates rate specific equalization based on the supported rates. According to another aspect of the invention, one or more predefined qualifier conditions, such as a loss of signal, are monitored during equalization and if a qualifier condition is detected, the determined equalization parameters are not updated.

Figure 1:
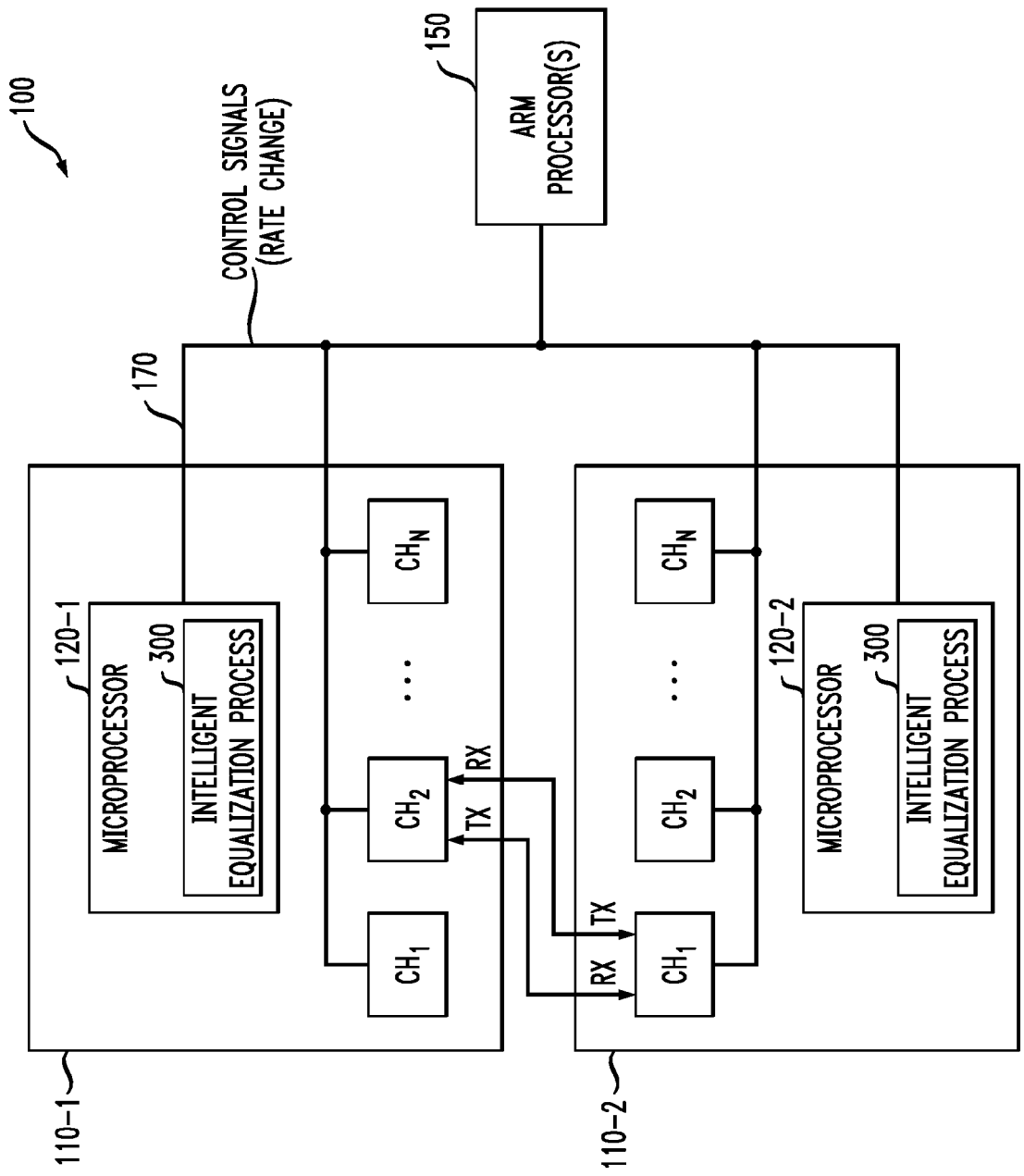
FIG. 1 illustrates an exemplary server environment in which the present invention can operate.

FIG. 1 illustrates an exemplary server environment 100 in which the present invention can operate. The exemplary server 100 includes a number of exemplary transceivers 110-1 and 110-2 for the transmission and reception of data. The exemplary transceivers 110-1 and 110-2 each support a receive (RX) and transmit (TX) function for multiple communication channels $CH_1$ through $CH_N$. As shown in FIG. 1, a second channel $CH_2$ on transceiver 110-1 is communicating with a first channel $CH_1$ on transceiver 110-2.

Typically, a server 100 will incorporate several layers of control. In the exemplary embodiment of FIG. 1, each transceiver 110-1 and 110-2 includes a corresponding microprocessor 120-1 and 120-2. The microprocessors 120-1 and 120-2 may be embodied, for example, as the Intel 8051 single chip microcontroller. The microprocessors 120-1 and 120-2 control the various channels $CH_1$ through $CH_N$ on the corresponding transceiver 110. The microprocessors 120-1 and 120-2 may perform round robin control to equalize each channel $CH_1$ through $CH_N$.

In addition, system level control in the exemplary embodiment is performed, for example, by an Advanced RISC Machine (ARM) 150. Among other control features, the ARM processor 150 may control the data rate and initiate a rate change in a known manner, as discussed hereinafter. The control information, including a late change, may be communicated by the ARM processor 150 to the microprocessors 120-1 and 120-2 and/or channels $CH_1$ through $CH_N$ on a given transceiver 110 using an exemplary backchannel 170

As previously indicated, the equalization parameters optimized for one data rate will typically not be applicable for another data rate. Thus, one aspect of the present invention maintains equalization parameters for each supported late and automatically activates late specific equalization based on the supported rates. As discussed further below in conjunction with FIG. 2, in the exemplary embodiment, the rate-specific equalization parameters comprise (1) signal amplitude for a gain stage, (2) high pass filtering for the zero control, (3) DFE thresholds for the data latches used during equalization, and (4) transition thresholds for the transition latches used during equalization.

Figure 2:
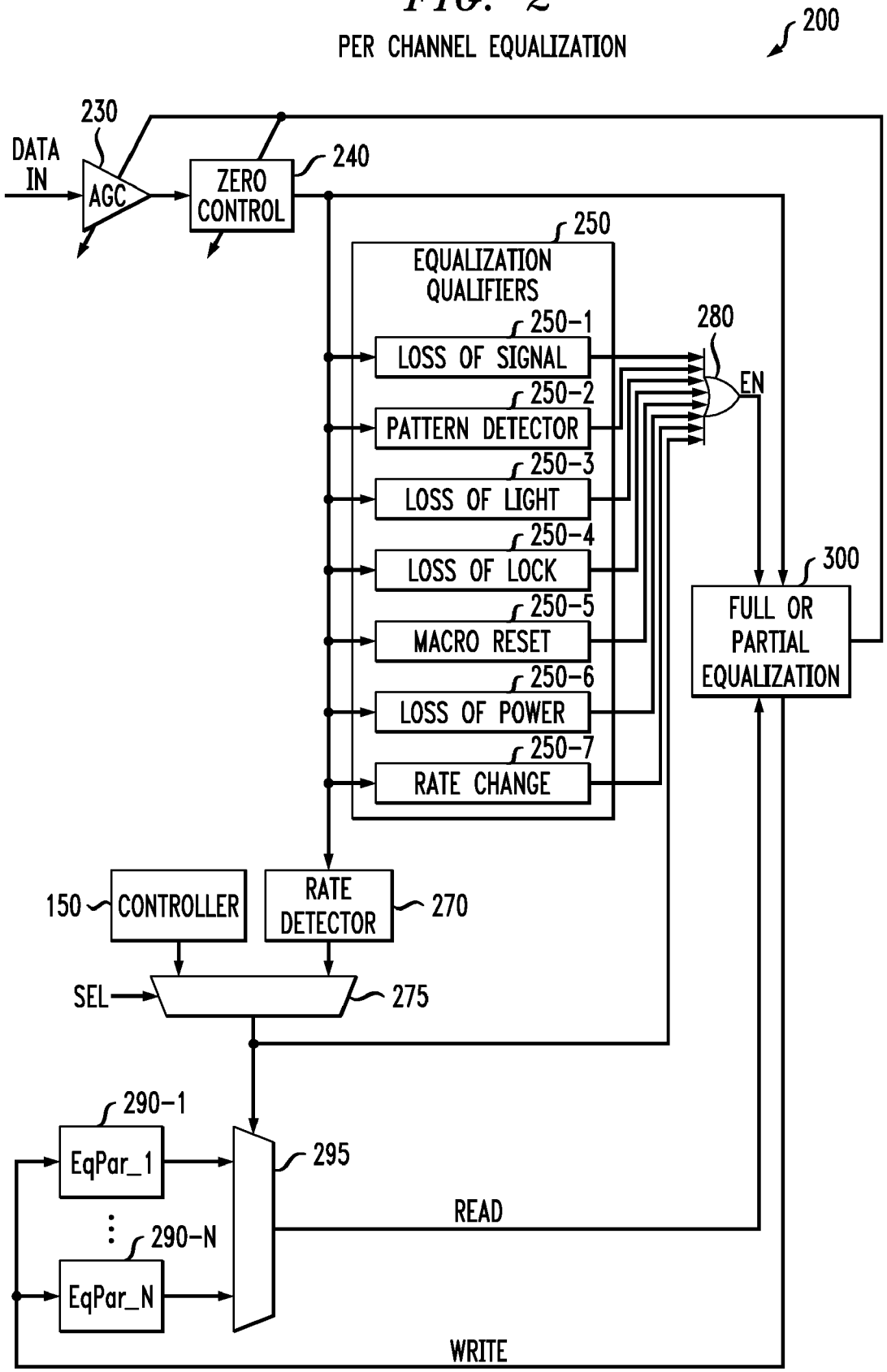
FIG. 2 is a schematic block diagram of a smart equalizer incorporating features of the present invention.

FIG. 2 is a schematic block diagram of a smart equalizer 200 incorporating features of the present invention. As shown in FIG. 2, a received signal is processed by an automatic gain control (AGC) stage 230 that typically attenuates the outer data eye to prevent the pre-amplified from saturating or a gain signal if the input amplitude is small. The AGC is discussed further below in conjunction with FIGS. 4A and 4B. Following the AGC, the attenuated signal is applied to a high pass filter 240 having zero control. The high pass filter 240 is discussed further below in conjunction with FIGS. 5A and 5B. The filtering performed by the high pass filter 240 is often considered to be part of the equalization process.

The filtered signal is then further equalized by a full or partial equalization process 300, as discussed further below in conjunction with FIG. 3. The rate-dependent parameters for the equalization process 300 are loaded from a storage element 290-1 through 290-N, where N is the total number of supported data rates. The particular storage element 290-1 through 290-N is selected by a multiplexer 295, based on a data rate signal generated in real-time by a rate detector 170.

The rate detector 270 may be embodied, for example, using the techniques described in U.S. patent application Ser. No. 11/686,144, filed Mar. 14, 2007, entitled "Method and Apparatus for Data Rate Detection Using a Data Eye Monitor," incorporated by reference herein. The data rate of a received signal is detected by sampling the received signal; comparing the samples for a plurality of full rate data eyes associated with the received signal to determine if there is a mismatch between at least two predefined samples; and detecting the data rate by evaluating the comparison based on predefined criteria. The comparison can be performed by an exclusive or (XOR) logic gate for samples of at least two adjacent data eyes of a given rate.

For example, when the data rate is a full data rate, the comparison determines if there is a mismatch in the sampled values associated with two adjacent full rate data eyes. Likewise, when the data rate is a half data rate, the comparison determines if there is a mismatch in the sampled values associated with two alternate full rate data eyes. When the data rate is a quarter data rate, the comparison determines if there is a mismatch in the sampled values associated with full rate data eyes having a separation of four. When the data rate is an octal data rate, the comparison determines if there is a mismatch in the sampled values associated with full rate data eyes having a separation of eight.

In addition, the smart equalizer 200 can optionally be notified of a rate change by the controller 150 (e.g., an ARM processor). A multiplexer 275 selects the rate information from the controller 150 or the rate detector 270 based on a select control signal. In this manner, the multiplexer 275 selects real-time rate detection or processor control.

In addition, the smart equalizer 100 includes one or more equalization qualifiers 250 that are monitored during equalization to ensure valid operation of the equalization process 300. As discussed further below in conjunction with FIG. 3, if a qualifier condition is detected, the determined equalization parameters are not updated. For example, the exemplary smart equalizer 200 includes a loss of signal detector 250-1, predefined pattern detector 250-2, a loss of light detector 250-3, a loss of lock detector 250-4, a macro reset detector 250-5, a loss of power detector 250-6 and a rate change detector 250-7. The various detectors in the equalization qualifier 250 may be embodied, for example, using sticky logic discussed further below in conjunction with FIG. 6. In the exemplary embodiment of FIG. 2, the signals generated by the various detectors in the equalization qualifier 250 are applied to an OR gate 280, that is used to enable the equalization process 300. In alternate implementations, the signals generated by the various detectors in the equalization qualifier 250 can be processed one at a time.

As indicated above, the present invention recognizes that equalization parameters vary with the data rate. The disclosed smart equalizer 100 adjusts the following equalization parameters: (1) signal amplitude for the AGC stage 230, (2) high pass filtering for the zero control 240, (3) DFE thresholds for the data latches used during equalization 300, and (4) transition thresholds for the transition latches used during equalization 300. The rate-dependent equalization parameters are stored in the storage element 290-1 through 290-N corresponding to the given data rate. The techniques of the present invention can be applied towards any form of equalization algorithm, such as an equalizer comprised of FIR filter coefficients.

Figure 3:
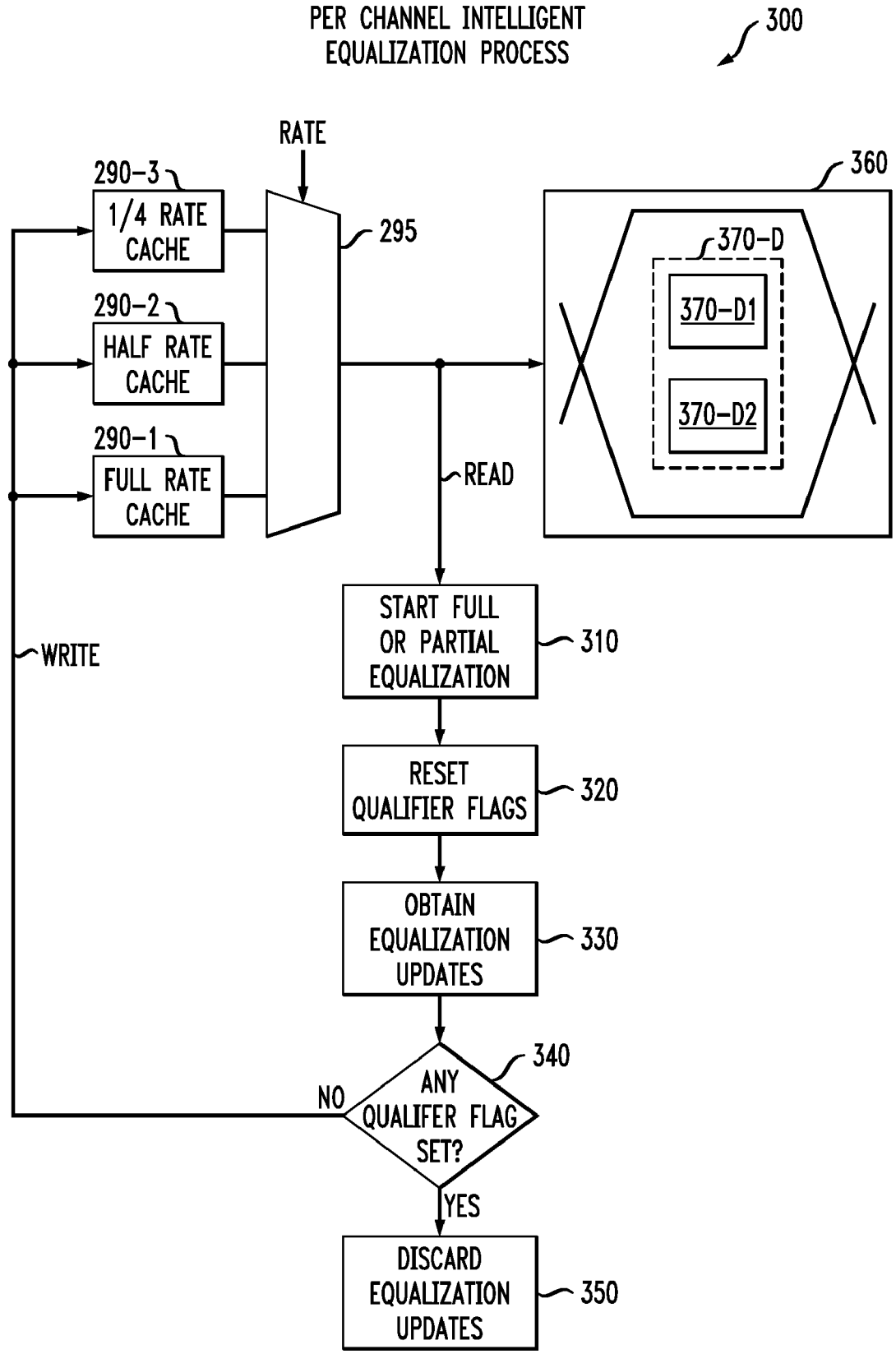
FIG. 3 is a flow chart describing an exemplary implementation of a smart equalization process incorporating features of the present invention.

FIG. 3 is a flow chart describing an exemplary implementation of a per channel intelligent equalization process 300 incorporating features of the present invention. Generally, the exemplary implementation of the intelligent equalization process 300 may employ a full or partial equalization. Typically, a full equalization is performed at system start-up or whenever there is no starting equalization information. During a full equalization, the full process is performed over the full range of possible values to determine the equalization parameters. A preset equalization can optionally be performed to load known equalization parameters for a given rate in the appropriate storage element 290. A partial (or steady state) equalization can optionally be performed when prior valid equalization parameters exist and can be used as a starting point. The partial equalization incrementally tracks changes from the known equalization state, in a known manner. In one implementation, a steady state flag can be set during a prior execution of the equalization process 200 to indicate that equalization parameters are available and partial equalization is appropriate.

As shown in FIG. 3, upon initiating a fall or partial equalization process during step 310, the intelligent equalization process 300 initially reads the appropriate rate-dependent equalization parameters from the corresponding cache 290, by applying the appropriate control signal to the multiplexer 295. The qualifier flags for the qualifier detectors 250 are reset during step 320. The equalization parameters (e.g., gain, high pass filter, DFE data and transition latch thresholds) are updated during step 330 using well-known techniques, such as a Least Mean Square algorithm or the data eye monitoring techniques referenced herein.

A test is performed during step 340 to determine if any qualifier flags were set during the current equalization iteration. If it is determined during step 340 that one or more qualifier flags were set during the current equalization iteration, then the updated equalization parameters are discarded during step 350. If, however, it is determined during step 340 that no qualifier flags were set during the current equalization iteration, then the updated equalization parameters are written to the appropriate cache 290.

As shown in FIG. 3, the rate-dependent parameters, such as thresholds for one or more data latches 370-D1, 370-D2 (collectively, 370-D), are used for real-time equalization during step 360.

AGC

Figure 4A:
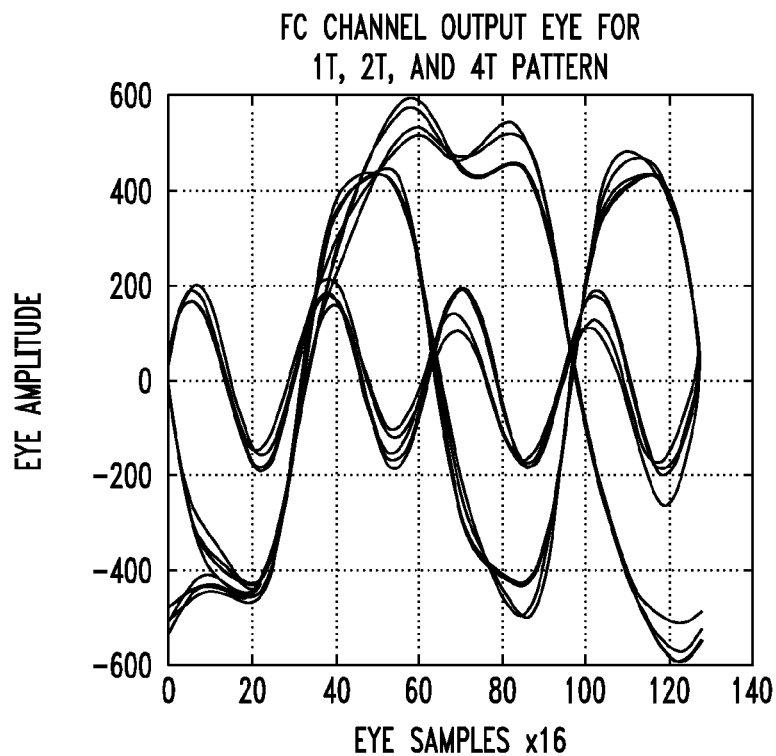
FIG. 4A illustrates an exemplary input signal to a pre-amplified in a receiver and FIG. 4B illustrates the saturation of the signal if the gain value is not set correctly, causing undesired compression of the received signal.
Figure 4B:
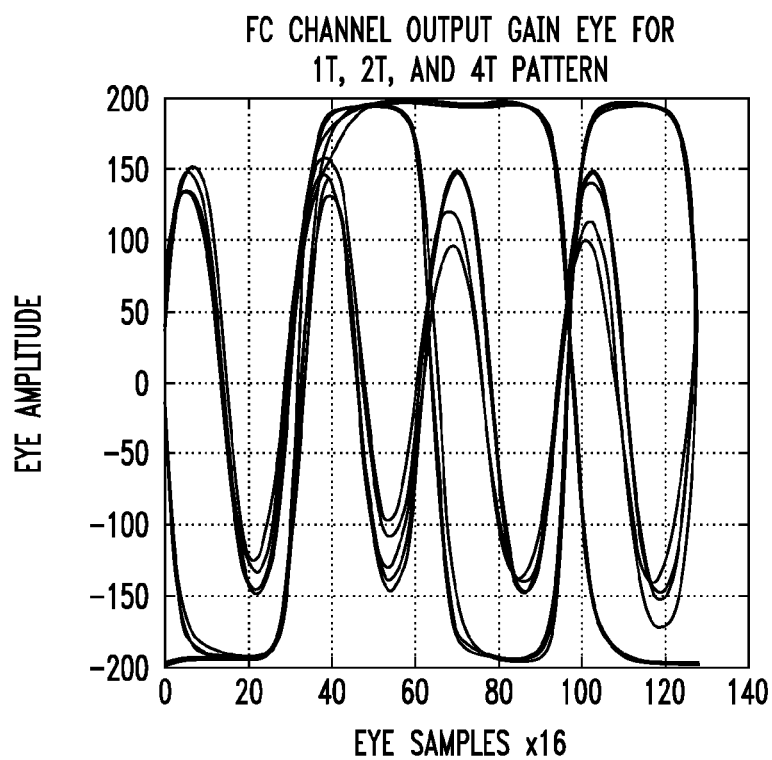

As previously indicated, the AGC 130 attenuates or amplifies the outer data eye for keeping the pre-amplifier from saturating. FIG. 4A illustrates an exemplary input signal to a pre-amplifier in a receiver and FIG. 4B illustrates the saturation of the signal if the gain value is not set correctly, causing undesired compression of the received signal This nonlinear effect renders the signal useless for linear equalizer.

High Pass Filtering

Figure 5A:
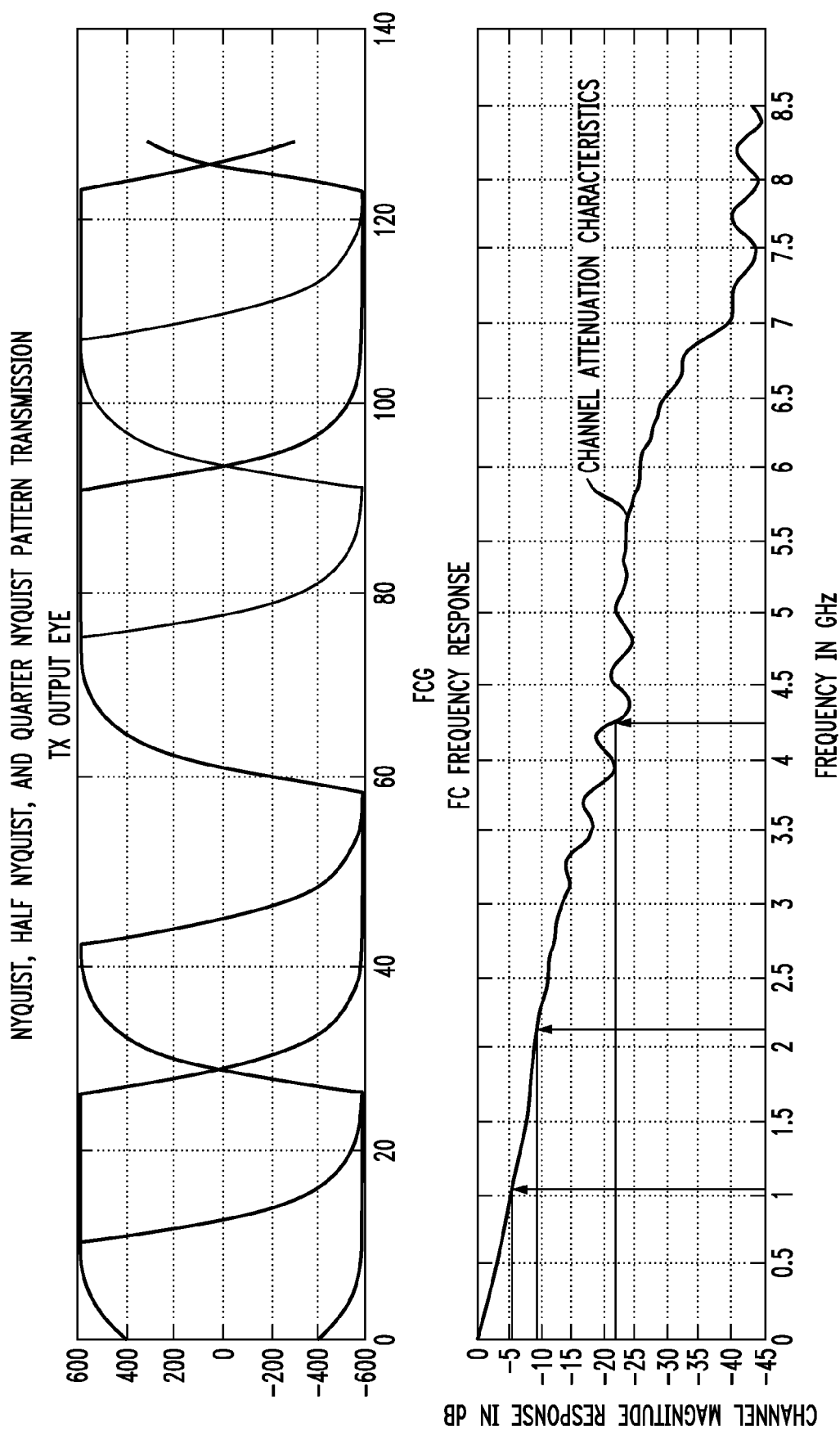
FIG. 5A illustrates the attenuation characteristics of an exemplary channel and FIG. 5B illustrates the transmitted full rate, half rate, and quarter late signal after traversing the lossy channel of FIG. 5A.
Figure 5B:
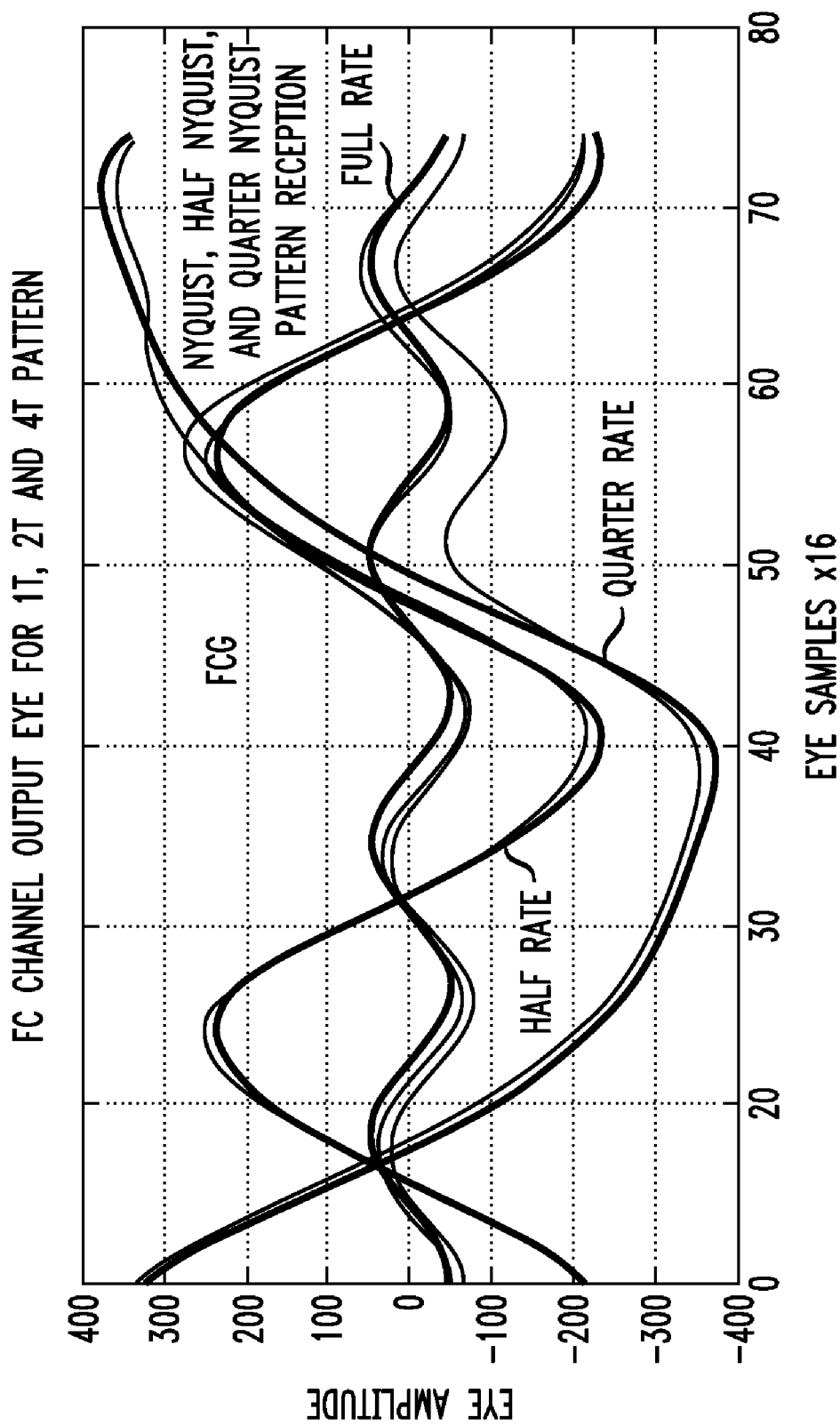

As previously indicated, the attenuated or amplified signal following AGC is applied to a high pass filter 140 having zero control This equalization parameter controls the magnitude of the high pass filtering on the pre-amplifier output. FIG. 5A illustrates the attenuation characteristics of an exemplary channel and FIG. 5B illustrates the received full rate, half rate, and quarter rate signal after traversing the lossy channel of FIG. 5A. In the upper panel of FIG. 5A, the amplitudes are the same for the various signal rates. As shown in FIG. 5B, the full rate signal is the most attenuated and the quarter rate signal is the least attenuated. To recover the distorted signal, the pre-amplifier asserts frequency selective high pass filtering on the received signal, in a known manner.

DEE Data and Transition Latch Thresholds

For a detailed discussion of suitable DFE data latch positioning techniques, see, for example, U.S. patent application Ser. No. 11/540,946, filed Sep. 29, 2006, entitled "Method and Apparatus for Determining Latch Position for Decision-Feedback Equalization Using Single-Sided Eye," and U.S. patent application Ser. No. 11/686,148, filed Mar. 14, 2007, entitled "Method and Apparatus for Decision-Feedback Equalization Using Single-Sided Eye with Global Minimum Convergence," each incorporated herein by reference. For a detailed discussion of suitable transition latch positioning techniques, see, for example, U.S. patent application Ser. No. 11/864,110, filed Sep. 28, 2007, entitled "Methods and Apparatus for Positioning One or More DFE Transition Latches Based on Incoming Data Eye," incorporated herein by reference.

Valid Equalization Operation

According to the equalization qualified aspect of the present invention, the smart equalizer 200 ensures that the determined equalization parameters aye valid before using them. In one exemplary embodiment, the determined equalization parameters are qualified against information from one or more detectors 250. For example, in the absence of any signal (loss of signal), the receiver lacks information (data transition) and cannot sustain a frequency lock. If the equalizer is allowed to train when the signal has been lost, the equalizer will produce invalid updates. The loss of signal detector 250-1 may be embodied, for example, as a received signal strength detector that triggers when the input signal amplitude falls below adjustable signal amplitude.

Likewise, there are a number of predefined patterns that are not sufficiently spectrally rich to provide valid equalization results For example, many communications systems continuously send an idle pattern to keep the system alive, in a similar manner to a heart beat signal. The idle pattern, however, is not spectrally rich and is therefore not good for equalization. Thus, if one or more predefined patterns are detected during an iteration of the smart equalization process 300, then the determined equalization parameters should be discarded.

The loss of light detector 250-3 may be embodied, for example, using data eye monitoring techniques to detect when there is substantially no eye opening. The exemplary loss of lock detector 250-4 may monitor a loss of lock signal generated by a clock and data recovery (CDR) system. The exemplary macro reset detector 250-5 can monitor signals to determine if a reset button has been pressed or if a reset signal has otherwise been generated. The exemplary loss of power detector 250-6 monitors signals to detect if a sleep or low power mode is entered. The exemplary rate change detector 250-7 can monitor the signals generated by the rate detector 270 to detect a rate change.

Figure 6:
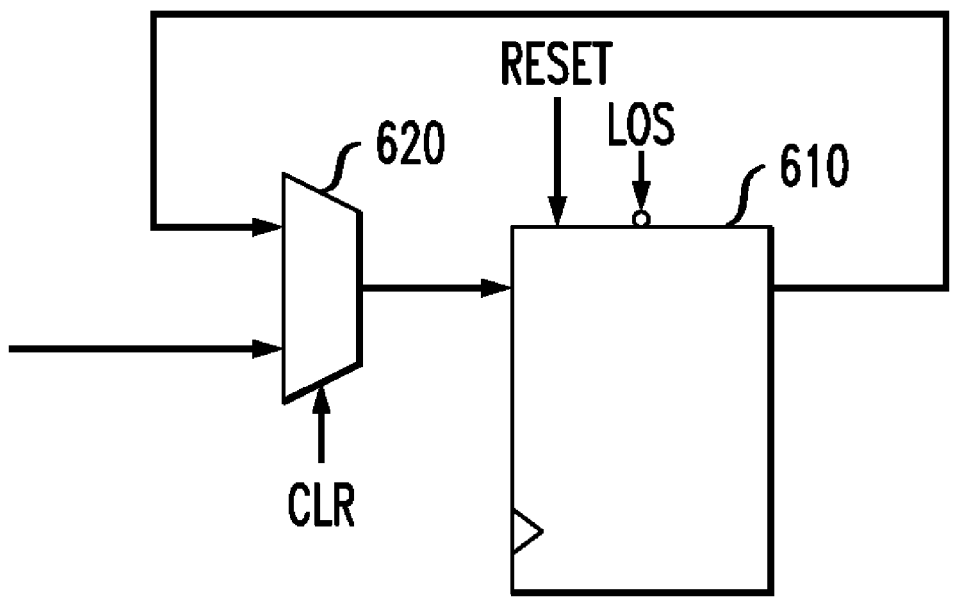
FIG. 6 is a schematic block diagram of an exemplary invalid equalization detector.

FIG. 6 is a schematic block diagram of an exemplary invalid equalization detector 600. The invalid equalization detector 600 processes the outputs of the various detectors 250 and sets a sticky bit if a predefined qualifier situation is detected. Generally, before the smart equalization process 300 is executed, the qualifier flags are reset during step 320 (e.g., the sticky status of the invalid equalization detector 600 is set to zero). While the smart equalization process 300 progresses, if at any instance the qualifier circuit 250 triggers, the invalid equalization detector 600 will asynchronously set the sticky register status. After the equalization completes, the smart equalization process 300 checks the qualifier status during step 340. If any sticky bit was set, the determined equalization results are discarded because at some point during the equalization process a qualifier condition was detected.

As shown in FIG. 6, the output of the detectors are each applied to corresponding sticky logic (registers) 610. Generally, a sticky register, once set to a logic value of one at any time, will maintain the value of one until reset. As indicated above, before the smart equalization process 300 is executed, the detector sticky status of the invalid equalization detector 600 is set to zero using a clear signal (CLR) applied to a multiplexer 620. The sticky logic (register) 610 is reset using a RESET control signal.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or mole aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for equalizing a received signal, comprising:
obtaining a plurality of samples of said received signal;
evaluating said received signal to determine a data rate of said received signal by comparing said samples for a plurality of full rate data eyes associated with said received signal to determine if there are one or more mismatches between said plurality of samples, wherein an occurrence of said one or more mismatches indicates said data rate;
obtaining one or more equalization parameters associated with said determined data rate; and
equalizing said received signal using said obtained one or more equalization parameters, wherein said equalization parameters comprise one or more of a gain parameter, zero control for a high pass filter and one or more threshold settings for one or more latches used during said equalizing step.

2. The method of claim 1, wherein said one or more latches comprise one or more data latches and one or more transition latches.

3. The method of claim 1, further comprising the step of determining said one or more equalization parameters.

4. The method of claim 3, further comprising the step of discarding said determined equalization parameters if one or more predefined qualifier conditions are detected during said equalizing step.

5. The method of claim 1, wherein said step of equalizing said received signal is an incremental steady state equalization if said equalization parameters have been previously determined for said determined data rate.

6. The method of claim 1, wherein said step of equalizing said received signal is a full equalization if valid equalization parameters are not available for said determined data rate.

7. The method of claim 1, wherein said data rate is determined by analyzing said received signal.

8. The method of claim 1, wherein said data rate is determined by obtaining a data rate established by a controller.

9. An equalizer for processing a received signal, comprising:
a data rate detector for evaluating a plurality of samples of said received signal to determine a data rate of said received signal by comparing said samples for a plurality of full rate data eyes associated with said received signal to determine if there are one or more mismatches between said plurality of samples, wherein an occurrence of said one or more mismatches indicates said data rate;
a plurality of storage elements each associated with a different data rate, each of said storage elements storing one or more equalization parameters for said associated data rate; and
equalization logic for equalizing said received signal using said obtained one or more equalization parameters, wherein said equalization parameters comprise one or more of a gain parameter, zero control for a high pass filter and one or more threshold settings for one or more latches used during said equalization.

10. The equalizer of claim 9, wherein said equalization logic comprises a programmed processor or an application specific integrated circuit.

11. The equalizer of claim 9, wherein said one or more latches comprise one or more data latches and one or more transition latches.

12. The equalizer of claim 9, wherein said equalization logic is further configured to determine said one or more equalization parameters.

13. The equalizer of claim 12, wherein said equalization logic is further configured to discard said determined equalization parameters if one or more predefined qualifier conditions are detected during said equalizing step.

14. The equalizer of claim 9, wherein said equalizing of said received signal by said equalization logic is an incremental steady state equalization if said equalization parameters have been previously determined for said determined data rate.

15. The equalizer of claim 9, wherein said equalizing of said received signal by said equalization logic is a full equalization if valid equalization parameters are not available for said determined data rate.

16. The equalizer of claim 9, wherein said data rate is determined by analyzing said received signal.

17. The equalizer of claim 9, wherein said data rate is determined by obtaining a data rate established by a controller.

18. A communications receiver for receiving a received signal, comprising:
- a data rate detector for evaluating a plurality of samples of said received signal to determine a data rate of said received signal by comparing said samples for a plurality of full rate data eyes associated with said received signal to determine if there are one or more mismatches between said plurality of samples, wherein an occurrence of said one or more mismatches indicates said data rate;
- a plurality of storage elements each associated with a different data rate, each of said storage elements storing one or more equalization parameters for said associated data rate; and
- equalization logic for equalizing said received signal using said obtained one or more equalization parameters, wherein said equalization parameters comprise one or more of a gain parameter, zero control for a high pass filter and one or more threshold settings for one or more latches used during said equalization.

\* \* \* \* \*

UNITED STATES PATENT AND TRADEMARK OFFICE
CERTIFICATE OF CORRECTION

PATENT NO. : 8,315,298 B2  
APPLICATION NO. : 11/930780  
DATED : November 20, 2012  
INVENTOR(S) : Pervez M. Aziz et al.

Page 1 of 1

It is certified that error appears in the above-identified patent and that said Letters Patent is hereby corrected as shown below:

Title Page, Item (75), Inventors "Pervez M Aziz, Mohammad S Mobin, Gregory W Sheets, Lane A Smith, Paul H. Tracy" should read --Pervez M. Aziz, Mohammad S. Mobin, Gregory W. Sheets, Lane A. Smith, Paul H. Tracy--.

In the Specification

Column 4, line 40, which reads: "the smart equalizer 100" should read --the smart equalizer 200--.

Signed and Sealed this  
Twenty-second Day of October, 2013

Teresa Stanek Rea  
*Deputy Director of the United States Patent and Trademark Office*